United States Patent [19]
Bryan

[11] Patent Number: 5,255,297
[45] Date of Patent: Oct. 19, 1993

[54] LOWER END FITTING WITH MULTISTAGE FLOW DIFFUSERS

[75] Inventor: William J. Bryan, Granby, Conn.

[73] Assignee: Combustion Engineering, Inc., Windsor, Conn.

[21] Appl. No.: 763,003

[22] Filed: Sep. 20, 1991

Related U.S. Application Data

[63] Continuation-in-part of Ser. No. 582,564, Sep. 14, 1990.

[51] Int. Cl.[5] ................................ G21C 1/04
[52] U.S. Cl. ...................... 376/352; 376/443; 376/444; 376/287
[58] Field of Search .............. 376/444, 443, 445, 352, 376/287; 976/DIG. 60

[56] References Cited

U.S. PATENT DOCUMENTS

| | | | |
|---|---|---|---|
| 4,678,627 | 7/1987 | Rylatt | 376/313 |
| 4,888,149 | 12/1989 | Bryan | 376/287 |
| 4,975,241 | 12/1990 | Haslinger et al. | 376/352 |
| 4,997,621 | 3/1991 | Johansson et al. | 376/444 |
| 5,071,617 | 12/1991 | Bryan et al. | 376/352 |
| 5,132,077 | 7/1992 | Bryan | 376/352 |

FOREIGN PATENT DOCUMENTS

| | | |
|---|---|---|
| 0196611 | 10/1986 | European Pat. Off. |
| 0361036 | 4/1990 | European Pat. Off. |
| 0433620A1 | 6/1991 | European Pat. Off. |

*Primary Examiner*—Donald P. Walsh
*Assistant Examiner*—Meena Chelliah
*Attorney, Agent, or Firm*—John H. Mulholland

[57] ABSTRACT

An improved lower end fitting 10 (L.E.F.) having a bell mouth multistage type of flow jet diffuser 30 with stages 31, 31' decreases pressure drop 15–20% over a single stage bell mouth diffuser and more evenly distributes flow and adds strength. It includes neutron thimble flux impingement shield 50 of instrument and/or cable. Each diffuser stage 31, 31' is S.S., of circular cross-sect. and parabolic to optimize diffusion. The multistage shape is based on lower core plate 20 flow hole 24 geometry, L.E.F. design and reactor flow rate. Thinner L.E.F. legs 36, smaller L.E.F. gussets 38 and thinner L.E.F. flow plates 22 are possible.

3 Claims, 4 Drawing Sheets

LOWER END FITTING WITH MULTISTAGE FLOW DIFFUSERS

RELATED APPLICATION

This application is a continuation-in-part of U.S. Ser. No. 07/582,564 filed Sep. 14, 1990 for Improved Lower End Fitting by William J. Bryan, inventor of the instant invention. The applications are commonly assigned to Combustion Engineering, Inc.

BACKGROUND OF THE INVENTION

The invention relates to pressurized water nuclear reactors and is for use in the same environment as U.S. patent application Ser. No. 07/582,589, filed substantially concurrently with the present application, by the same inventor, for "Bottom Nozzle to Lower Grid Attachment". More specifically, the device relates to the lower core plate to fuel assembly interface.

The invention is an improved multistage design created more evenly to distribute the flow within and above the lower end fitting to decrease the jet flow impingement on fuel rods. This improves reactor performance by improving the performance of diffusing lower core plate flow jets. The desired result sought and achieved is a decrease of flow induced vibration of the fuel rods and stiffening and lightening of the lower end fitting. In the past, flow induced vibration of fuel rods in their lower spans has caused high fuel rod wear rates. This has resulted in the use of a stronger grid and more massive support system in the lower section of the fuel assemblies. The current and prior art practice of using inconel lower grids, with their high neutron capture, is to achieve these required supporting forces. The need for the improved lower end fitting thus also results from the desire for vibration elimination which would allow use of a low parasitic material such as Zircaloy 4. Use of an integral wear-reduction-shield of the type taught in U.S. Pat. No. 4,888,149 issued to the inventor of the present invention also provides strength to the new lower end fitting.

SUMMARY OF THE INVENTION

The novel bottom nozzle or end fitting device of the invention is constructed of stainless steel and is located immediately above the lower core plate flow holes. The device is circular and has a curved profile. The geometry of the devices, their number and height, is dependent on the reactor core plate geometry and the size of the lower end fitting. The devices are rigidly held in place by members extending from the edges of the device to the lower end fitting support legs and the thimble flux shield. This stiffens the end fitting and permits a reduced thickness of the flow plate and legs. The curved shapes are multistaged parabolic type and are adjusted to optimize the diffusion of the jet to lower pressure drop. The diffusers are bell mouth in type and have a unique shape dictated by the reactor and fuel assembly design. Based on the lower core plate flow hole geometry, lower end fitting design, and the reactor flow rate, the multistaged diffuser shapes are optimized to achieve maximum jet diffusion and resultant reduction in damaging vibration of fuel rods and pressure drop due to turbulence.

The device of the parent application acts as bell mouth annular diffusers causing the lower core plate flow hole jets to be diffused and evenly spread before impingement on fuel rods located above the end fitting. This results in a calculated 10% to 15% lower pressure drop for the lower end fitting. It also lowers the jet flow impingement on the assembly's fuel rods. Less jet flow impingement results in lower fuel rod wear due to flow induced vibration of the fuel rods. The addition of these devices are also used as structural members of the end fitting. The devices and members and their placement results in thinner lower end fitting legs, smaller lower end fitting gussets, and thinner flow plates while still maintaining the original strength of the lower end fitting.

The multistage device of the present application is constructed of stainless steel and located above the lower core plate flow holes. Each device is circular and has a curved profile with one device located above the other. The geometry of the devices, their number and height, is dependent on the reactor core plate geometry and the size of the lower end fitting. The devices are held in place by members extending from the edges of the device to the lower end fitting support legs and the thimble flux shield. The curved shapes are parabolic type and are adjusted to optimize the diffusion of the jet. The diffusers are multistage in type and have a unique shape dictated by the reactor and fuel assembly design. Based on the lower core plate flow hole geometry, lower end fitting design, and the reactor flow rate, the diffuser shapes are optimized to achieve maximum jet diffusion.

DETAILED DESCRIPTION OF THE ILLUSTRATED EMBODIMENT

Figure 1:
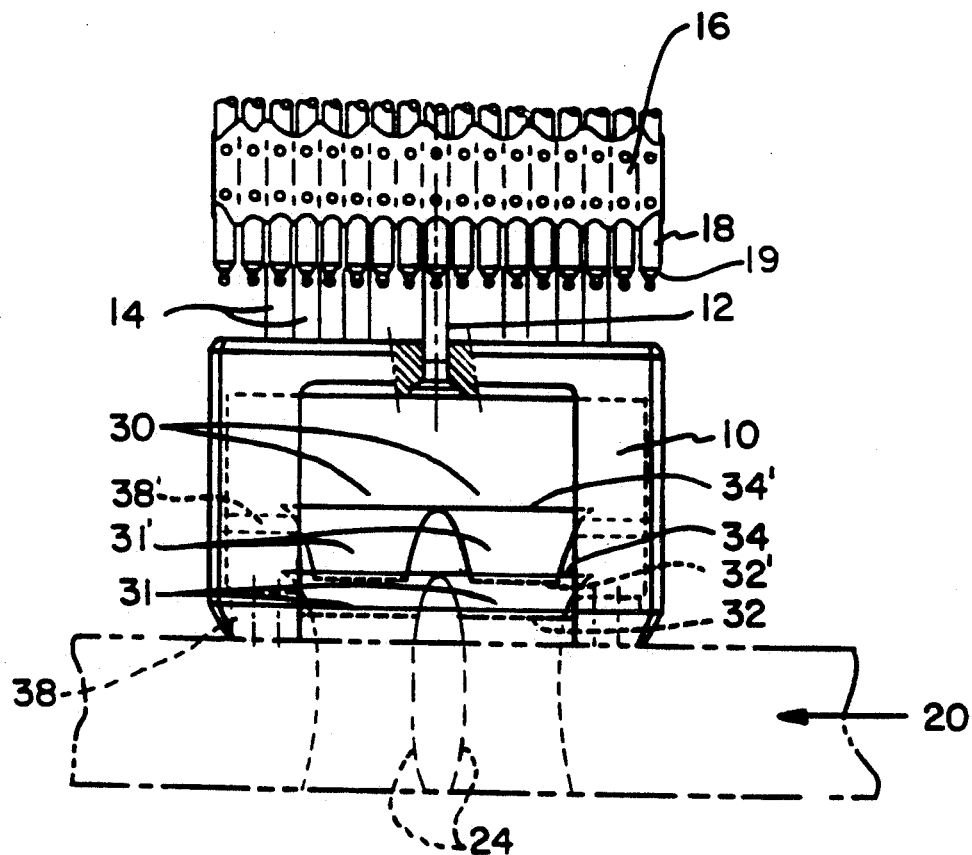
FIG. 1 is a partial schematic elevational view of the lower end of a pressurized water nuclear reactor fuel assembly with the improved lower end fitting of the invention with multistage flow diffusers and associated core plate.

The number 10 generally designates the improved lower end fitting with multistage flow diffusers constructed according to the invention. The end fitting 10 is attached by means of instrumentation tube 12 and guide tubes 14 to the remaining fuel assembly structure, as represented by lower grid 16 and fuel rods 18 having caps 19 and being partially shown in FIG. 1. A typical pressurized water nuclear reactor lower core plate 20 is shown in dotted lines in FIG. 1.

Diffusing flow between the multi-holed lower core plate 20 and the multi-holed top flow plate 22 of the lower end fitting, below the fuel rods 18, are the bell mouth type flow diffusers 30.

As flow in the reactor core leaves the openings 24 in lower core plate 20 it is directed to and enters the lower end and smaller ends 32 of each multistage diffusers' 30 first stage 31 and second stage 31'.

Figure 3:
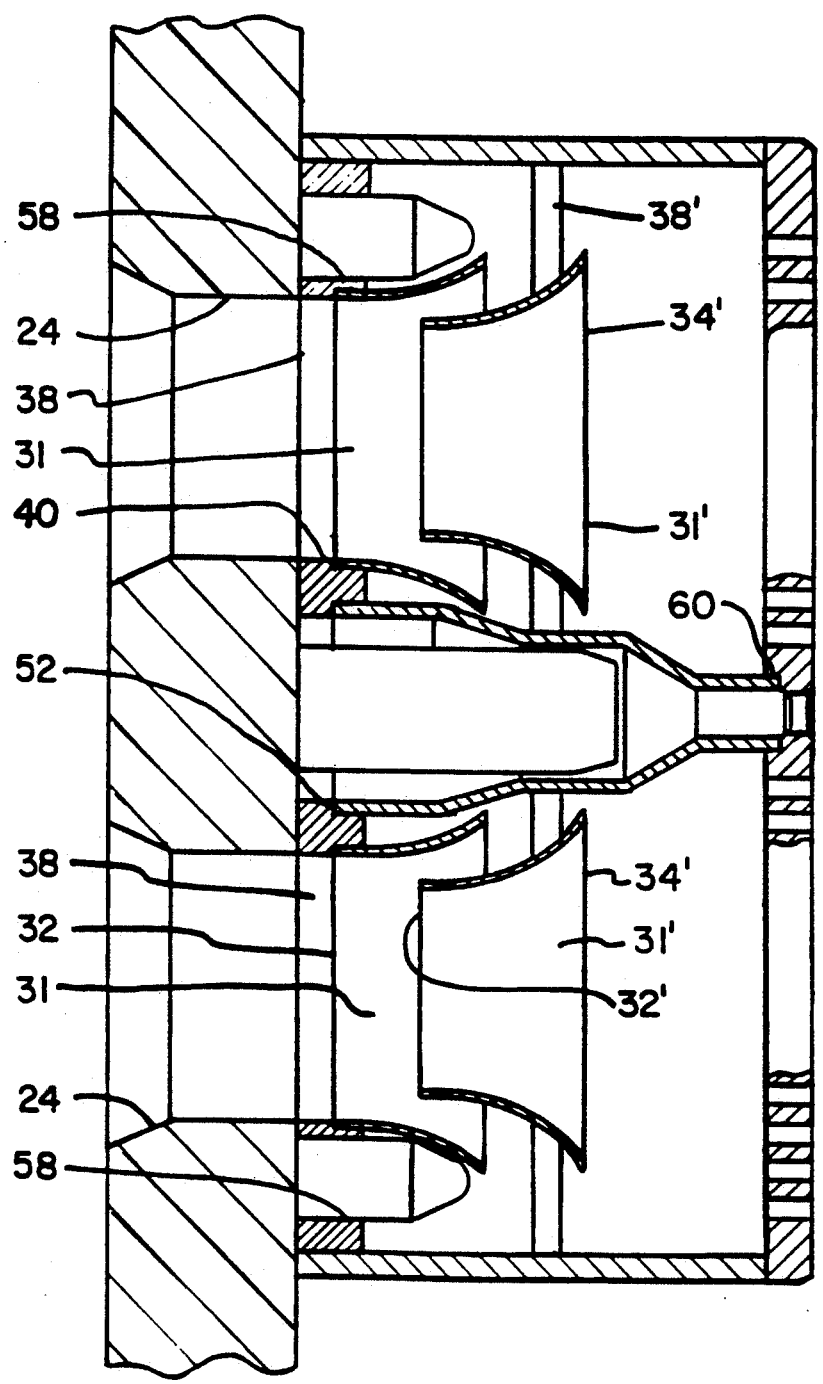
FIG. 3 is a cross-section along the line 3—3 of FIG. 2 and through the adjacent core plate portion.
Figure 4:
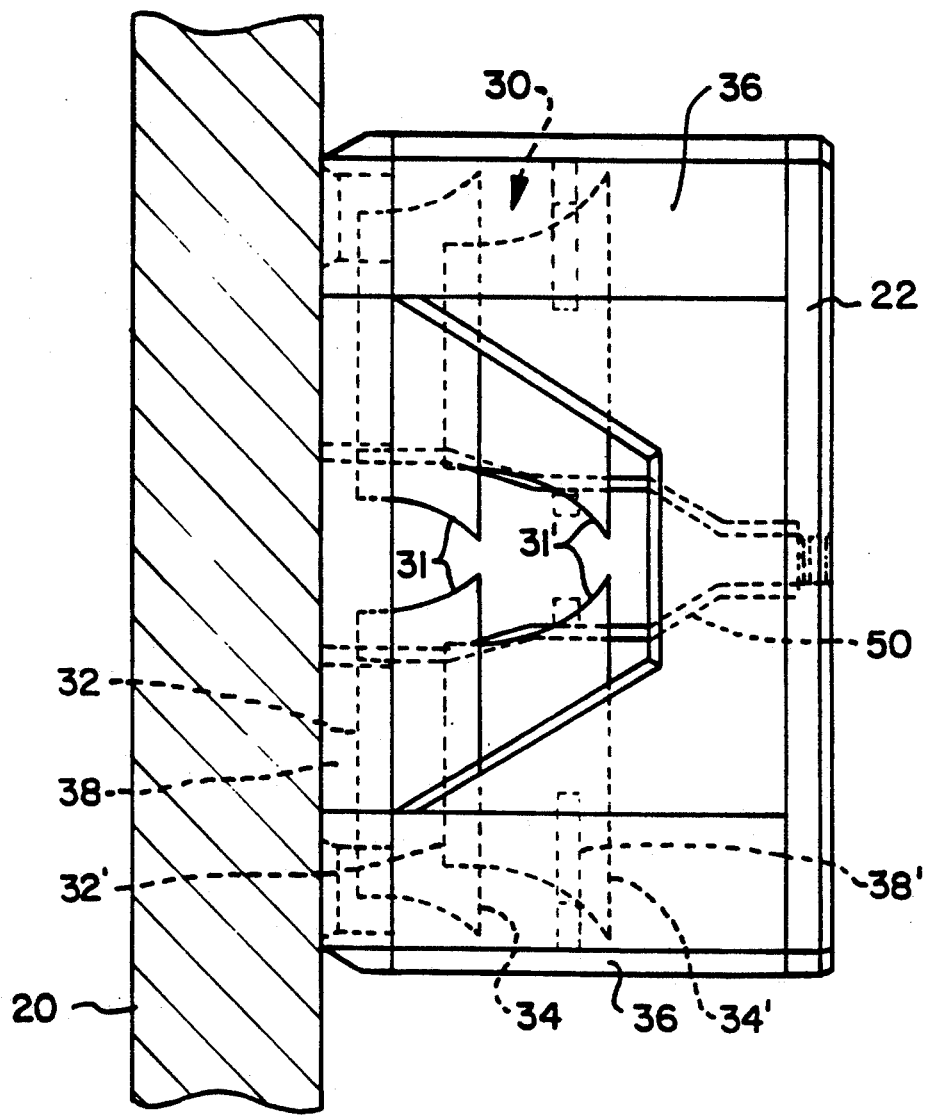
FIG. 4 is a cross-section taken along the line 4—4 of FIG. 2.

As seen in FIGS. 3 and 4, the curved shape from smaller ends 32, 32' to larger outlet ends 34, 34' of each stage 31, 31' of diffuser 30 is a parabolic type adjusted in their bell mouth shape in a manner dictated by the particular lower core plate flow hole geometry, lower end fitting design, and the reactor flow rate to achieve maximum jet diffusion. This, in turn, produces a resultant reduction in damaging vibration of fuel rods 18 and pressure drop through turbulence.

Multistages 31, 31' give advantages over the single stage flow diffuser of the parent application Ser. No. 07/582,564 which theoretically can exceed 15% to 20%, for reasons given in the *Handbook of Hydraulic Resistance,* 2nd edition, I. E. Idelchik; 1986 Hemisphere Publishing Corp. In particular, see the explanation in Section V, pages 151 to 188. See also, in particular, Diagram 5-19 on page 188 and FIG. 5.4 on page 163, with accompanying text.

The multistage diffusers 30 also act to stiffen the lower end fitting 10 by having each stage 31, 31' rigidly connected to the legs 36 at the corners of the lower end fitting by horizontal webs 38, 38' which are integral with legs 36. The diffusers 30 are mounted in recesses in webs 38, 38' defined by counterbores 40.

Figure 2:
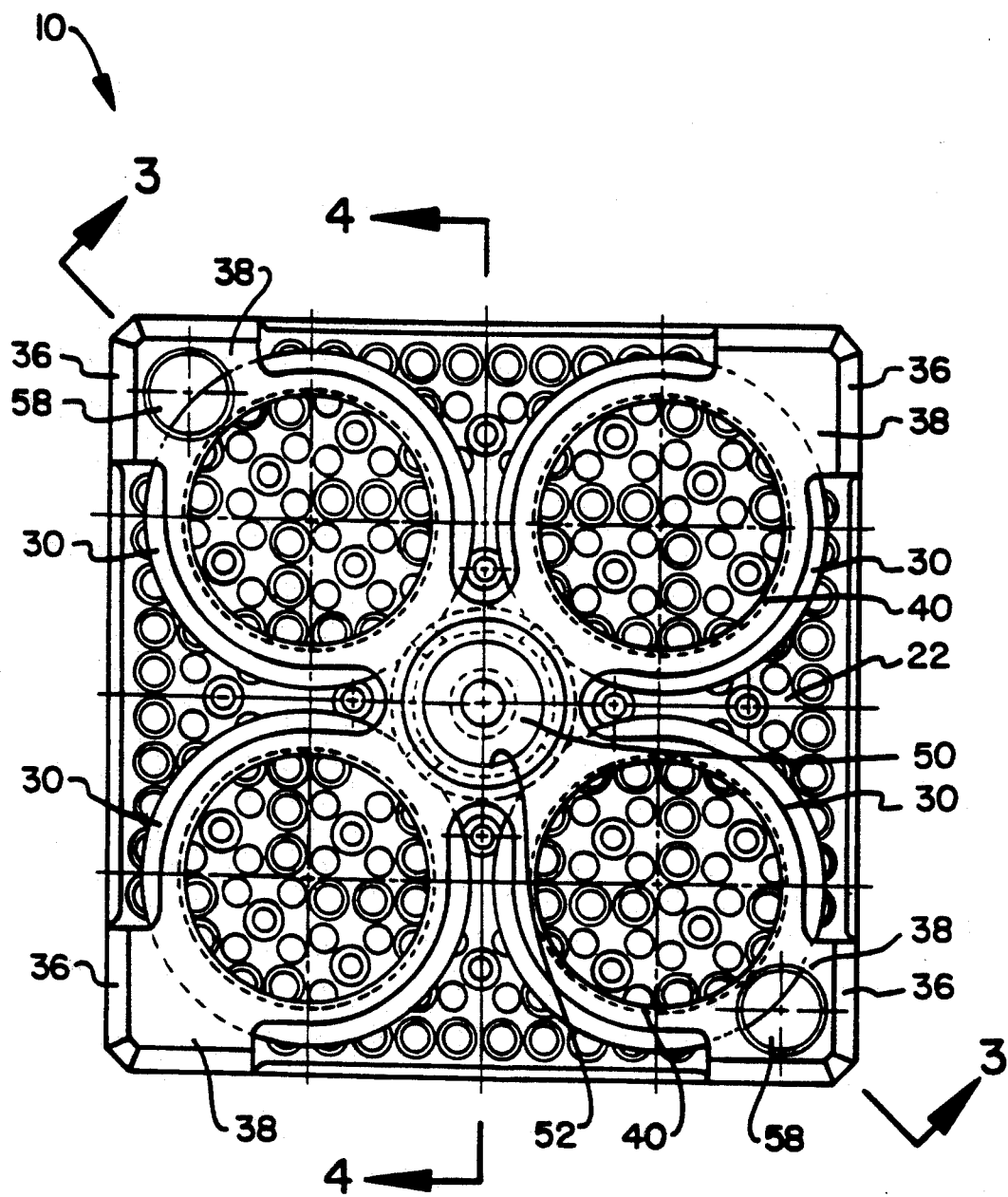
FIG. 2 is a detailed bottom view of the lower end fitting of the invention showing multistaged flow diffusers and an integral wear-reduction shield for thimbles.

Also adding rigidity to the lower end fitting is a wear-reduction-shield 50 mounted in a central opening 52 in web 38. The opening 52 and web 38 form a hub which provides the central opening for an in-core-instrumentation thimble (not shown). This structure will be clearly understood from reading my U.S. Pat. No. 4,888,149. It will be apparent from the drawings here presented as FIGS. 2-4, that wear-reduction-shield 50 will, when the proper relationship between lower end fitting 10 and the core plate 20 are established by pins 56 and holes 58 in web 38, act further to stiffen the end fitting 10. Moreover, the relationship of shield 50 to a counterbore 60 in top flow plate 22 and counterbore 52 is such that it will help prevent tilting or tipping of the end fitting 10 and therefore prevent legs 36 from entering holes 24 in core plate 20. Again, see my U.S. Pat. No. 4,888,149.

I claim:

1. An improved lower end fitting for a fuel rod containing fuel assembly of a pressurized water nuclear reactor, said lower end fitting having a top flow plate, and legs for engaging a lower core plate of said reactor and comprising:

multistage means for diffusing flow between the lower core plate and the lower end fitting top flow plate below the fuel rods, which diffusion spreads and evens flow in a manner which minimizes jet flow impingement on fuel rods above the lower end fitting and therefore reduces fuel rod vibration and fuel assembly pressure drop;

said multistage means for diffusion flow also acting as a means for stiffening the lower end fitting by being rigidly connected to the legs of the end fitting, thereby permitting said legs and flow plate to be thinner and of less mass.

2. The improved lower end fitting of claim 1 in which a wear-reduction-shield for thimbles is provided centrally of the structure and acts further to stiffen the end fitting.

3. The improved lower end fitting of claim 1 in which the means for diffusing is of such shape and dimension that it acts to eliminate the possibility of said legs from entering holes in the reactor core plate.

* * * * *